US010836512B2

(12) United States Patent
Bushroe (10) Patent No.: US 10,836,512 B2
(45) Date of Patent: Nov. 17, 2020

(54) ENERGY EFFICIENT SPHERICAL MOMENTUM CONTROL DEVICES

(71) Applicant: HONEYWELL INTERNATIONAL INC., Morris Plains, NJ (US)

(72) Inventor: Michael Wayne Bushroe, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1013 days.

(21) Appl. No.: 15/148,912

(22) Filed: May 6, 2016

(65) Prior Publication Data

US 2017/0320598 A1 Nov. 9, 2017

(51) Int. Cl.
*B64G 1/28* (2006.01)
*G01C 19/06* (2006.01)

(52) U.S. Cl.
CPC ............... *B64G 1/28* (2013.01); *B64G 1/286* (2013.01); *G01C 19/06* (2013.01)

(58) Field of Classification Search
CPC ........ G01C 19/18; G01C 19/06; G01C 19/24; G01C 19/08; B64G 1/28
USPC .......................................................... 74/5.7
See application file for complete search history.

(56) References Cited

U.S. PATENT DOCUMENTS

| | | | |
|---|---|---|---|
| 2,978,913 A | 4/1961 | Freebairan, Jr. et al. | |
| 3,017,777 A | 1/1962 | Haeussermann | |
| 3,105,657 A | 10/1963 | Meuller et al. | |
| 3,209,602 A | 10/1965 | Biderman | |
| 3,252,340 A | 5/1966 | Watt et al. | |
| 3,258,223 A | 6/1966 | Skov | |
| 3,260,475 A | 7/1966 | Ormsby | |
| 3,421,715 A | 1/1969 | Cohlan | |
| 3,451,274 A | 6/1969 | Davies et al. | |
| 3,697,143 A * | 10/1972 | Klinchuch | F16C 32/0404 310/90.5 |

(Continued)

FOREIGN PATENT DOCUMENTS

EP 2955114 A1 12/2015

OTHER PUBLICATIONS

Extended EP Search Report for Application No. 17166382.6-1754 dated May 10, 2017.

*Primary Examiner* — Randell J Krug
(74) *Attorney, Agent, or Firm* — Lorenz & Kopf, LLP (57) ABSTRACT

Embodiments of a spherical momentum control device are provided. In one embodiment, the spherical momentum control device includes a housing assembly bounding a cavity, a rotor support axle disposed within the cavity, and a spherical bearing interface formed between the rotor support axle and the housing assembly. The spherical bearing interface facilitates rotation of the rotor support axle within the cavity about three orthogonal axes transecting substantially at the cavity center point. A rotor is mounted to the rotor support axle (e.g., through precision bearings) for rotation about a spin axis. The spherical bearing interface can assume any form for facilitating rotation of the rotor support axle about the orthogonal axes including, for example, a low friction plane bearing interface. In one embodiment, the spherical bearing interface includes rolling element bearings embedded in the cavity walls or embedded in enlarged end caps forming part of the rotor support axle.

15 Claims, 6 Drawing Sheets

(56) References Cited

U.S. PATENT DOCUMENTS

| | | | | |
|---|---|---|---|---|
| 3,698,251 A | * | 10/1972 | Silvia | F16C 11/0619 |
| | | | | 384/496 |
| 3,722,295 A | * | 3/1973 | Passarelli, Jr. | G01C 19/20 |
| | | | | 74/5 R |
| 3,779,087 A | * | 12/1973 | Dickie | G01C 19/28 |
| | | | | 74/5.6 D |
| 3,902,374 A | * | 9/1975 | Hoffman | G01C 19/24 |
| | | | | 74/5.6 D |
| 4,019,392 A | * | 4/1977 | Zamfirescu | G01C 19/30 |
| | | | | 74/5 R |
| 4,143,466 A | | 3/1979 | Quermann | |
| 4,285,553 A | * | 8/1981 | Robinson | B64G 1/24 |
| | | | | 310/90.5 |
| 4,441,375 A | | 4/1984 | Misobara et al. | |
| 4,611,863 A | | 9/1986 | Isely | |
| 4,961,352 A | | 10/1990 | Davies et al. | |
| 5,321,986 A | * | 6/1994 | Sears | G01C 19/30 |
| | | | | 74/5.46 |
| 5,413,010 A | | 5/1995 | Nakanishi et al. | |
| 5,767,595 A | * | 6/1998 | Rosen | H02K 11/048 |
| | | | | 310/74 |
| 5,798,590 A | | 8/1998 | Sakakibara | |
| 7,121,159 B2 | | 10/2006 | Tippett | |
| 7,675,208 B2 | | 3/2010 | Bandera | |
| 8,164,294 B2 | | 4/2012 | Chetelat | |
| 8,179,007 B2 | | 5/2012 | Walt | |
| 2002/0145077 A1 | | 10/2002 | Shultz | |
| 2014/0209751 A1 | | 7/2014 | Stagmer | |

* cited by examiner

ENERGY EFFICIENT SPHERICAL MOMENTUM CONTROL DEVICES

TECHNICAL FIELD

The present invention relates generally to momentum control devices and, more particularly, to spherical momentum control devices, which are relatively energy efficient and which are well-suited for deployment onboard small satellites.

BACKGROUND

Reaction Wheel Assemblies (RWAs) and Control Moment Gyroscopes (CMGs) are commonly deployed onboard satellites and other vehicles for attitude adjustment purposes. By positioning multiple momentum control devices in an array, highly controlled rotational adjustments can be performed about all orthogonal axes in three dimensional space. It has long been recognized that a simplified satellite attitude adjustment system could be produced utilizing a Spherical Momentum Control (SMC) device, which allowed the orientation of its spin axis to be adjusted in three rotational degrees of freedom. Such an attitude adjustment system could theoretically contain a single SMC device or two redundant SMC devices, providing significant reductions in cost, weight, and complexity relative to conventional attitude adjustment systems containing three to four RWAs or CMGs. While numerous SMC devices have been proposed, however, the adoption of such devices has been hampered by overly complex designs, weighty constructions, high power consumption rates, and other limitations. High power consumption rates are of a particular concern as satellites continue to decrease in size and mission durations lengthen. So-called "CubeSats" and other "SmallSats" (satellites weighing less than 400 kilograms), in particular, could greatly benefit from a relatively compact, lightweight, and simplified attitude control system of the type potentially enabled through the realization of an SMC device, which is relatively energy efficient and which otherwise overcomes the limitations set-forth above.

BRIEF SUMMARY

Embodiments of a Spherical Momentum Control (SMC) device are provided. In certain embodiments, the SMC device includes a housing assembly containing a cavity, a rotor support axle disposed within the cavity, and a spherical bearing interface formed between the rotor support axle and the housing assembly. The spherical bearing interface facilitates rotation of the rotor support axle within the cavity about three orthogonal axes transecting substantially at the center point of the cavity. The spherical bearing interface can assume any form for restricting movement of the rotor support axle to rotation about orthogonal axes including, for example, a low friction plane bearing interface. In one embodiment, the spherical bearing interface includes rolling element bearings embedded in the interior of the housing assembly or in enlarged end caps forming part of the rotor support axle. A rotor is mounted to the rotor support axle for rotation about a spin axis utilizing, for example, one or more precision spin bearings. The spherical momentum control device may further include an electromagnetic drive system, which magnetically drives rotation of the rotor about the spin axis and which selectively rotates the rotor support axle relative to the housing assembly to generate a controlled output torque and effectuate desired attitude adjustments during operation of the SMC device.

In further embodiments, the SMC device includes a housing assembly, a rotor support axle contained within the housing assembly and movable with respect thereto about three orthogonal axes, and a rotor contained within the housing assembly and rotatably mounted to the rotor support axle for rotation about a spin axis. The housing assembly may include a generally spherical cavity in which the rotor support axle and the rotor are disposed. In one implementation, the generally spherical cavity has a diameter $D_{CAVITY}$, the rotor support axle has a maximum length $L_{AXLE}$, and the rotor has a maximum diameter $D_{ROTOR}$, which are dimensioned such that $D_{CAVITY} > L_{AXLE} > D_{ROTOR}$. The SMC device may further include a plurality of rolling element bearings supporting the rotor support axle within the generally spherical cavity. The plurality of rolling element bearings may be embedded within the rotor support axle and project outwardly therefrom to contact an interior portion of the housing assembly defining the generally spherical cavity. Alternatively, the plurality of rolling element bearings may be embedded within an interior portion of the housing assembly and project inwardly therefrom to contact enlarged end regions or polar caps provided at opposing ends of the rotor support axle.

In still further embodiments, the SMC device may include a rotor and a rotor support axle. The rotor support axle may include, in turn, a shaft extending through the rotor and polar end caps positioned on opposing sides or halves of the rotor. The polar end caps may be joined by the shaft and may each have an enlarged radial geometry relative to the shaft. One or more spin bearings may further be disposed between the shaft and the rotor in a manner facilitating rotation of the rotor relative to the rotor support axle about a spin axis. In one implementation, the SMC device further includes a housing assembly having a generally spherical cavity, which contains the rotor and the rotor support axle. In this case, the polar end caps may each have an outer surface geometry substantially conformal with a portion of the generally spherical cavity.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

The following describes embodiments of a Spherical Momentum Control (SMC) device, which is relatively compact, lightweight, energy efficient, and scalable by design. As indicated by the term "spherical," embodiments of the SMC device contain a generally spherical cavity that houses an inertial mass or rotor, which can be rotated about orthogonal axes transecting substantially at the center point of the cavity. The term "spherical," as appearing in the recitation "spherical momentum control device" or "SMC device," is utilized in reference to the general geometry of this cavity and the corresponding spherical bearing interface formed between the interior of the housing assembly and the rotor support axle, as described in detail below. The term "spherical," as appearing in the aforementioned recitations, then should not be considered limiting with respect to any other feature or component of the SMC device unless such features or components are expressly and unambiguously described as "spherical" in the Claims section of this document. The rotor of the SMC device and the SMC device, generally, may well have a generally spherical form factor in some embodiments, but are by no means required to have spherical geometries in all embodiments.

The SMC device includes a spherical bearing interface formed between the walls of the generally spherical cavity and a rotor support axle to which the rotor is mounted. The rotor support axle may include, in turn, opposing enlarged terminal end portions or "polar end caps" between which an elongated shaft extends. The polar end caps may extend beyond the rotor, as taken along the longitudinal axis of the rotor support axle, such that a circumferential gap or radial standoff is provided between the outer surface of the rotor and the cavity walls. In certain embodiments, the polar end caps may have outer spherical cap surfaces, which contact the interior of the housing assembly bounding the spherical cavity to form a plane bearing interface therewith. In this case, the interior of the spherical cavity and/or the polar end caps may be coated with a low friction material present as, for example, a continuous layer or strategically-positioned raised pads. Alternatively, rolling element bearings can be embedded within the interior of the housing assembly to contact the polar end caps or, conversely, embedded within the polar end caps to contact the interior of the housing assembly. In still further embodiments, other bearing interfaces can be utilized to facilitate rotation of the rotor support axle about orthogonal axes including active bearing systems, such as magnetic bearings and air bearings, albeit with certain tradeoffs or penalties.

Regardless of the particular manner in which the spherical bearing interface is implemented, a second bearing interface is further provided between the shaft of the rotor support axle and the surrounding rotor. One or more spin bearings (e.g., rolling element bearings) may be provided at this interface to permit low friction rotation of the rotor about the rotor support axle. During SMC device operation, an electromagnetic drive system drives rotation of the rotor about a spin axis. The rotor support axle may or may not rotate about the spin axis in conjunction with rotation of the rotor. The end result is a highly efficient rotor support or suspension system, which enables high speed rotation of the rotor about the spin axis with extremely low frictional losses and periodic driving by the electromagnetic drive system. Furthermore, as the orientation of the rotor support axle (and, therefore, the orientation of the rotor and spin axis) can be precisely adjusted, appropriate attitude adjustments to the host satellite (or other vehicle) can be performed in any given direction in three dimensional space by adjusting either the angular orientation or the rotational speed of the rotor. The ability of the SMC device to provide a highly controlled torque output in any direction in three dimensional space allows the production of an attitude adjustment system containing a reduced number of (e.g., one or two) momentum control devices. Relative to conventional attitude adjustment systems, which typically contain three to four Reaction Wheel Assemblies (RWAs) or Control Movement Gyroscopes (CMGs), such an attitude adjustment system can provide significant reductions in the overall cost, weight, envelope, and complexity of the resulting attitude control system.

Figure 1:
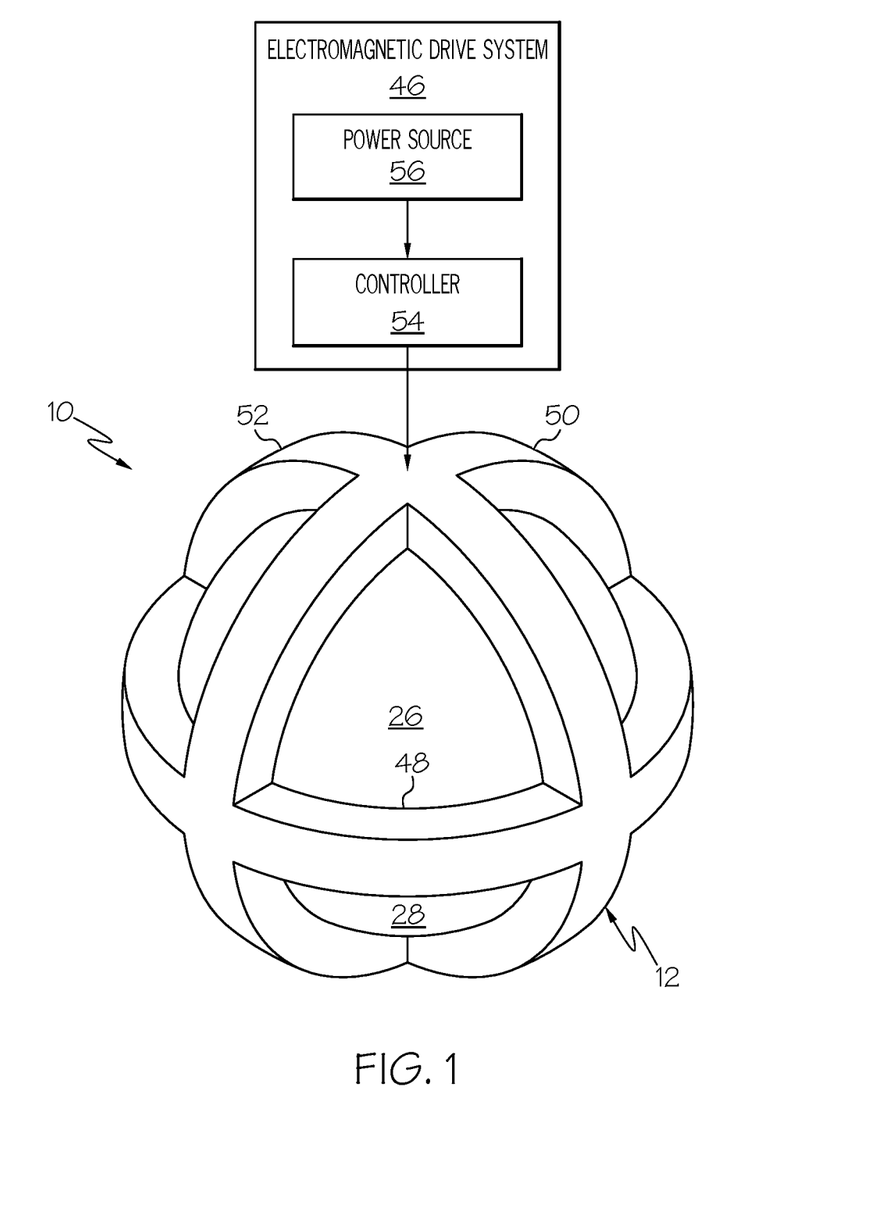
FIGS. 1 and 2 are isometric and partially exploded views, respectively, of a spherical momentum control (SMC) device, which contains a generally spherical cavity and which is illustrated in accordance with an exemplary embodiment of the present invention.
Figure 2:
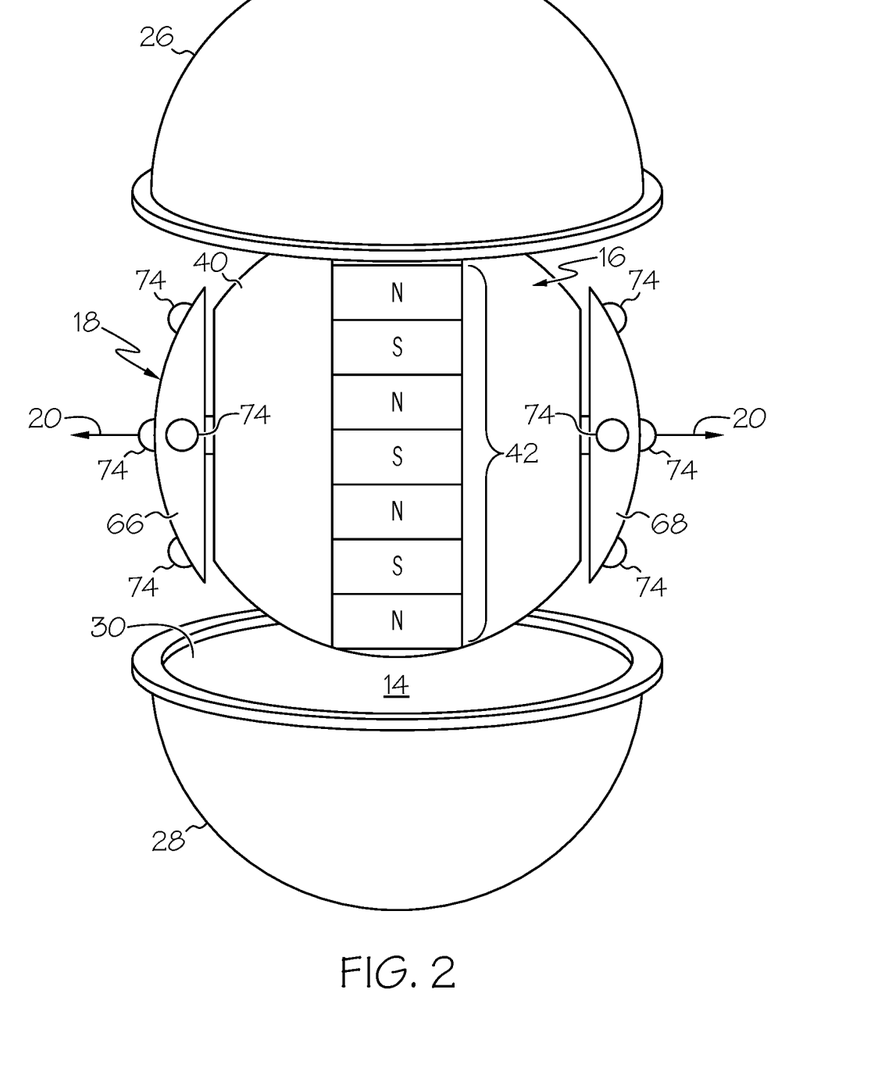

FIGS. 1 and 2 are isometric and partially exploded views, respectively, of an SMC device 10, as illustrated in accordance with an exemplary embodiment of the present invention. SMC device 10 is further illustrated in cross-section in FIGS. 3 and 4, as taken along perpendicular section planes transecting at the center of device 10. SMC device 10 features a relatively compact, lightweight, scalable, and energy-efficient design and is consequently well-suited for deployment onboard small satellites or "SmallSats." For this reason, SMC device 10 is primarily described below in connection with small satellites. This notwithstanding, it is emphasized that SMC device 10 (and the other SMC devices described herein) are not limited to any particular application or usage. Instead, SMC device 10 can be deployed onboard various different types of vehicles regardless of size and whether such vehicles are spaceborne, as well as utilized within non-vehicular applications and platforms.

Figure 3:
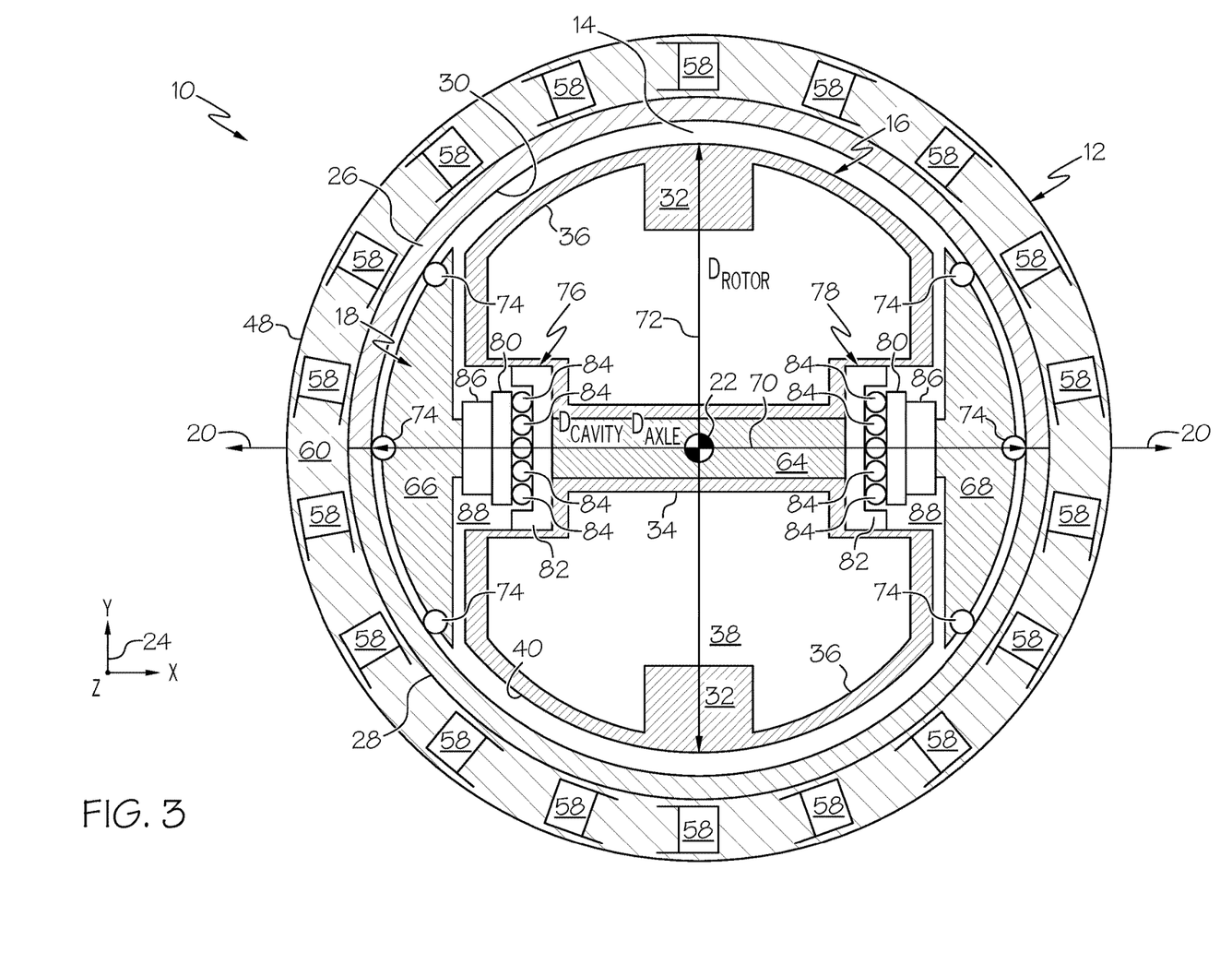
FIG. 3 is a cross-sectional view of the SMC device shown in FIGS. 1 and 2 taken along a first section plane, which more clearly illustrates the spherical bearing interface formed between the enlarged end portions or "polar end caps" of the rotor support axle and the generally spherical cavity containing the axle and rotor.

Referring collectively to FIGS. 1-4, SMC device 10 includes a housing assembly 12, which encloses a generally spherical cavity 14. A rotor 16 and a rotor support axle 18 are contained within generally spherical cavity 14. Rotor 16 is mounted to rotor support axle 18 and can rotate relative thereto about a spin axis 20 (FIGS. 2 and 3). Additionally, both rotor 16 and rotor support axle 18 can rotate about three orthogonal axes, which correspond to the X-, Y-, and Z-axes identified by coordinate legend 24 in FIGS. 3 and 4. The three orthogonal axes (the X-, Y-, and Z-axes) transect substantially at the center point of generally spherical cavity 14, which is further represented by symbol 22 shown in FIG. 3 (also representative of the center of mass of rotor 16). Rotor 16 and rotor support axle 18 rotate in unison about axes that are non-parallel to spin axis 20. In certain cases, rotor 16 may also rotate in unison with rotor support axle 18 about spin axis 20. It will often be the case, however, that rotor support axle 18 rotates about spin axis 20 at a lower rate of speed than does rotor 16 or that rotor 16 does not typically rotate about axis 20, as determined by the design and operational parameters of SMC device 10.

In the relatively simple example shown in FIGS. 1-4, housing assembly 12 includes upper and lower hemispherical halves 26, 28. Halves 26, 28 of housing assembly 12 are joined together to form a generally spherical shell, which encloses rotor 16 and rotor support axle 18. Shell halves 26, 28 include inner cavity walls 30, which combine to bound or define generally spherical cavity 14. Shell halves 26, 28 can be bolted together, clamped, or otherwise attached to define generally spherical cavity 14 in this manner. In embodiments in which generally spherical cavity 14 is hermetically sealed when SMC device 10 is assembled, housing assembly 12 may also include one or more non-illustrated sealing elements (e.g., gaskets or O-rings) and a vacuum port to allow a vacuum to be drawn within cavity 14 for terrestrial testing purposes; however, this need not be the case in all embodiments. As indicated above, housing assembly 12 is shown in a highly simplified in the illustrated example. In further embodiments, housing assembly 12 can include additional or alternative components, which are joined together utilizing any combination of fasteners, welding, threaded attachment, and other joinder techniques. Housing assembly 12 can and typically will include various other non-illustrated components in actual implementations of SMC device 10, such as a spacecraft mounting interface (e.g., a circumferential flange with bolt holes extending around a mid portion of housing assembly 12), wiring harnesses, and the like.

Figure 4:
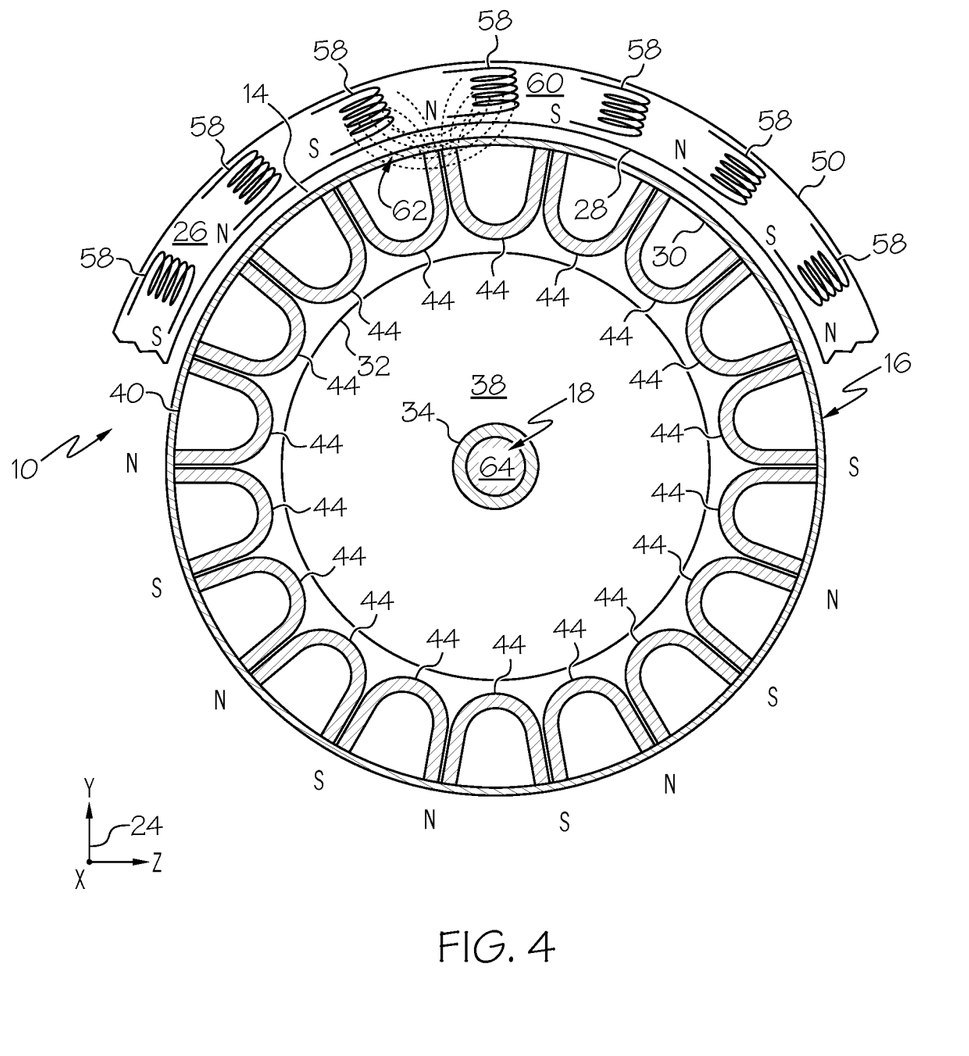
FIG. 4 is a cross-sectional view of the SMC device shown in FIGS. 1-3 taken along a second section plane perpendicular to the first section plane, which more clearly illustrates one manner in which an annular array or alternating band of permanent magnets can be embedded in the rotor body in a manner enabling rotor movement control by a surrounding electromagnetic drive system.

Rotor 16 can have any geometry and construction providing that: (i) rotor 16 fits within the envelope of cavity 14, and (ii) rotor 16 can adequately function as an energy-storing inertial element. It is generally desirably, however, to optimize the momentum-generating capabilities of rotor 16 over its operational speed range relative to overall rotor mass. This may be accomplished by locating a substantial portion or the bulk of rotor 16 as distantly from spin axis 20 as cavity dimensions and manufacturing tolerances will permit, while still ensuring that contact does not occur between static housing assembly 12 (particularly, cavity walls 30) and the rapidly spinning rotor. In this regard, and as indicated in FIGS. 3 and 4, rotor 16 usefully includes a midsection or equatorial region 32 having a radially-thickened geometry. When viewed in three dimensions, thickened equatorial region 32 is an annular structure that effectively serves as a flywheel. In addition to equatorial region 32, rotor 16 includes an inner tubular core 34, which registers rotor 16 to rotor support axle 18; e.g., tubular core 34 may have a longitudinal channel therethrough through which the shaft of rotor support axle 18 extends. A joinder portion 36 is further provided to physically connect equatorial region 32 to inner tubular core 34. In the illustrated example, joinder portion 36 assumes the form of a spherical shell such that rotor 16 has a substantially spherical outer geometry 40. Joinder portion 36 will consequently be referred to as "rotor shell portion 36" hereafter; however, in other embodiments, rotor shell portion 36 may have a different form, such as that of a radially-extending or disc-shaped web, suitable for joining equatorial region 32 to tubular core 34.

As previously indicated, equatorial region 32 is produced have a radially-thickened geometry as compared to the relatively thin-walled rotor shell portion 36 to optimize the mass-to-momentum capability of rotor 16. In this manner, a substantial portion of the rotor mass may be concentrated around the rotor midsection and, specifically, within equatorial region 32 serving as a momentum-storing flywheel. Additionally, if desired, one or more voids or openings may be formed within or through rotor 16 to further reduce rotor mass; e.g., as indicated in FIGS. 3 and 4, an annular void 38 may be provided within rotor 16 and around spin axis 20. Rotor 16 can be produced from any number of components and, in the embodiment shown in FIGS. 1-4, may be produced from two or more components that are welded or otherwise joined to enclose annular void 38. The components of rotor 16 will often be (but are not necessarily) produced form a metal or alloy, such as steel. In further implementations, rotor 16 may include a supplemental rim affixed around the rotor midsection and produced from a composite material, such as a carbon fiber composite.

Rotor 16 is fabricated to include regions of alternating magnetic polarity, which are distributed across the outer surface 40 in a manner enabling magnetic interaction with the below-described magnetic drive system. As indicated in FIG. 2 by graphic 42, and as generally indicated in FIG. 3, regions of alternating north and south polarity can be arranged in an annular band, which extends around a mid section of rotor 16. This can be accomplished by, for example, embedding permanent magnets and possibly other ferromagnetic structures, such as pole pieces, within the body of rotor 16. Consider, for example, the cross-sectional view of FIG. 4 illustrating one manner in which U-shaped or horseshoe magnets 44 can be embedded within the body of rotor 16 in a circumferential array or annular grouping. As can be seen, each magnet 44 is positioned such that its respective north and south poles are positioned adjacent the north and south poles, respectively, of the neighboring magnets 44. As an additional benefit, disposition of magnets 44 within thickened equatorial region 32 further helps concentrate mass around a mid-plane of rotor 16. In further embodiments, additional permanent magnets may be embedded within rotor 16 at other locations to, for example, create distinct regions of varying magnetic polarity across the entire outer surface of rotor 16. As a still further possibility, rotor 16 can be designed such that points of variable reluctance are provided across the body of rotor 16 by, for example, producing rotor 16 from a ferromagnetic material and providing recesses or "dimples" in outer rotor surface 40 in a manner somewhat similar to the dimpled skin of a golf ball.

As identified FIG. 1, SMC device 10 further includes an electromagnetic drive system 46, which magnetically controls movement of rotor 16 and rotor support axle 18. During operation of SMC device 10, controller 54 selectively energizes an array of electromagnets distributed around generally spherical cavity 14 to control the spin rate of rotor 16 about spin axis 20, as well as the angular orientation of rotor 16 and rotor support axle 18 within generally spherical cavity 14. In certain cases, electromagnetic drive system 46 may also directly control the spin rate rotor support axle 18 about spin axis 20. Electromagnetic drive system 46 may include any combination of power sources, electromagnets, sensors, thermal management devices, and wiring architectures suitable for performing such functions. In the illustrated example, electromagnetic drive system 46 includes three control ring structures 48, 50, 52 (shown in FIGS. 1, 3, and 4), which are described more fully in the following paragraph. Electromagnetic drive system 46 also includes a controller 54 and a power source 56, both of which are schematically shown in FIG. 1. Controller 54 can be implemented utilizing any suitable number of individual microprocessors, navigational equipment, memories, power supplies, storage devices, interface cards, and other standard components known in the art. Additionally, controller 54 may include or cooperate with any number of software programs or instructions designed to carry out the various methods, process tasks, calculations, and control functions described herein.

Control ring structures 48, 50, 52, are positioned around generally spherical cavity 14 in a mutually orthogonal relationship. As shown most clearly in FIGS. 3 and 4, each control ring structure 48, 50, 52 contains an annular grouping or circumferential array of electromagnets 58, which are embedded or housed within a surrounding ring body 60. The ring body 60 of each control ring structure 48, 50, 52 may be any annular fixture or structure suitable for retaining electromagnets 58 in their desired position. For example, in certain embodiments, the ring bodies 60 of control ring structure 48, 50, 52 may each comprise an injection molded ring in which electromagnets 58 are embedded. Wiring (only partially shown) may extend from electromagnets 58 to controller 54, which is further connected to power source 56. Electromagnets 58 may be wound in accordance with various different stator winding techniques suitable for dynamically driving rotor movement across all requisite rotor rotational angles. The positioning and design of the electromagnet array may vary in alternative embodiments; e.g., a spherical array of electromagnets may be distributed around and surround the substantial entirety of generally spherical cavity 14. During SMC device operation, controller 54 appropriately energizes electromagnets 58 to control the timing and location of the drive fields in manner controlling the spin rate of rotor 16, the angular orientation of rotor 16, and the angular orientation of rotor support axle 18. Control schemes for electromagnetically-driving the rotation of a rotor or inertial mass are known, in a general sense, and will be recognized as adaptable for usage within SMC device 10 by one of ordinary skill in the relevant field given the benefit of this document. The magnetic interaction between selected electromagnets 58 and rotor 16 is indicated, in a limited illustrative sense, by flux line graphic 62 in FIG. 4.

With continued reference to FIGS. 1-4, and as shown most clearly in FIGS. 2 and 3, rotor support axle 18 includes an elongated rotor shaft 64, which extends between and terminates at two polar end caps 66, 68. Polar end caps 66, 68 are affixed to the opposing ends of rotor shaft 64 and may be integrally formed therewith. Polar end caps 66, 68 have an enlarged radial geometry relative to rotor shaft 64 such that end caps 66, 68 extend beyond rotor shaft 64 in radial directions. Rotor support axle 18 may be substantially laterally bisymmetrical, as taken about midline plane orthogonal to the longitudinal axis of axle 18, with each axle half having a substantially mushroom-shaped cross-sectional geometry. Rotor support axle 18 can be produced from multiple pieces (e.g., two halves having mushroom-shaped cross-sectional geometries at the shaft-end cap interfaces), which are threadably attached or otherwise joined to produce axle 18 and locate the below-described spin bearings during manufacturing of SMC device 10. Additionally, in certain embodiments, rotor support axle 18 may be magnetized such that polar end caps 66, 68 have opposing magnetic polarities to provide still further opportunities for magnetic interaction with electromagnetic drive system 46.

A spherical bearing interface is provided between polar end caps 66, 68 and inner cavity walls 30 of housing assembly 12. The spherical bearing interface can be any type of bearing interface having a generally spherical geometry and confining movement of rotor support axle 18 (and therefore rotor 16) about three orthogonal axes (the X-, Y-, and Z-axes identified in coordinate legend 24) intersecting substantially at the center point of cavity 14. Additionally, the spherical bearing interfaces ideally offers robust support of rotor support axle 18 throughout its angular Range of Motion (ROM), while further providing a relatively low friction interface between support axle 18 and cavity walls 30. Rotor 16 is desirably recessed from the spherical bearing interface to avoid undesired contact between housing assembly 12 and the rapidly spinning rotor. Rotor 16 is thus desirably dimensioned such that a radial gap or circumferential standoff is provided between outer rotor surface 40 and inner cavity walls 30 of housing assembly 12. Accordingly, rotor support axle 18 may have a maximum length ($L_{AXLE}$) as taken along spin axis 20 (represented in FIG. 3 by double-headed arrow 70), while rotor 16 has a maximum outer diameter ($D_{ROTOR}$; represented in FIG. 3 by double-headed arrow 72) less than $L_{AXLE}$. Furthermore, the length of rotor support axle 18 is dimensioned to be nearly equivalent, but slightly less than the inner diameter of generally spherical cavity 14 ($D_{CAVITY}$) such that $D_{CAVITY} > L_{AXLE} > D_{ROTOR}$.

To minimize friction along the spherical bearing interface, a number of rolling element bearings 74 can be embedded within polar end caps 66, 68, as shown in FIGS. 2 and 3. Rolling element bearings 74 project outwardly from polar end caps 66, 68 to contact inner cavity walls 30 defining generally spherical cavity 14. In this case, inner cavity walls 30 are imparted with a substantially smooth surface, which effectively serves as a three dimensional outer race over which the rolling elements of bearings 74 may travel. Rolling element bearings 74 are single point ball bearings in the illustrated example and may be regarded generally as specialized ball transfer units, which are adapted for in-space usage (when SMC device 10 is deployed onboard a spacecraft) and integrated into polar end caps 66, 68. Each rolling element bearing 74 may contain a single spherical rolling element or ball, which is captured in a pocket or cavity formed in polar end caps 66, 68. Rolling element bearings 74 are distributed across the outer faces of polar end caps 66, 68 in an array that is axisymmetric about spin axis 20 to provide uniform support of rotor support axle 18 regardless of the angular orientation of axle 18 within generally spherical cavity 14. Stated differently, rolling element bearings 74 are embedded within rotor support axle 18 (specifically, within the outer faces of polar end caps 66, 68) and project outwardly therefrom to contact an interior portion of housing assembly 12 defining generally spherical cavity 14. In further embodiments, rolling element bearings 74 may contain a different type of rolling element, such as cylindrical rollers arranged in one or more rings distributed around polar end caps 66, 68. In such embodiments, the rollers may be rounded to match the radius of the inner surface of generally spherical cavity 14.

A second bearing interface is further provided between rotor support axle 18 and rotor 16 to facilitate rotation of rotor 16 about spin axis 20. For example, as indicated in FIG. 3, a first precision spin bearing 76 may be disposed around a first end portion of rotor shaft 64 at a location adjacent polar end cap 66, while a second precision spin bearing 78 may be disposed a second, opposing end portion of rotor shaft 64 at a location adjacent polar end cap 68. Rotor 16 is formed to include recesses 88 in which spin bearings 76, 78 are matingly received. Thus, in the illustrated example, spin bearings 76, 78 are embedded or recessed within rotor 16; however, this need not be the case in all embodiments. Spin bearings 76, 78 are selected to provide a low friction rotary interface between rotor 16 and rotor support axle 18. Spin bearings 76, 78 each assume the form of an annular ball bearing including an annular outer ring 80 and a cup-shaped inner ring 82; the terms "outer" and "inner" defined relative to the center of generally spherical cavity 14. Spin bearings 76, 78 also include plurality of rolling elements 84 (e.g., balls), which are captured between rings 80, 82. Spin bearings 76, 78 may be secured around rotor shaft 64 utilizing retaining nuts 86, which may threadably engage rotor shaft 64 and which may be tightened exert a desired axial preload across bearings 76, 78. Spin bearings 76, 78 may be imparted with a tapered race (that is, bearings 76, 78 may be tapered race ball bearings) to provide increased thrust support of rotor 16 throughout its angular ROM. In further embodiments, spin bearings 76, 78 may be a different type of rolling element bearing, such as roller bearings.

By providing precision spin bearings at the interface between rotor support axle 18 and rotor 16, and/or by providing two series-coupled rotary interfaces between static housing assembly 12 and rotor 16, rotor rotation can be initiated and maintained with exceptionally low frictional losses. SMC device 10 can consequently support high speed rotation of rotor 16 over prolonged periods of time with only periodic electromagnetic driving (as may occur in a quiescent mode of electromagnetic drive system 46) and, therefore, minimal power consumption. SMC device 10 thus provides a highly energy efficient momentum control device, which can be deployed onboard small satellites challenged with long term mission durations; e.g., mission durations on the scale of several weeks or years. Additionally, the physical interface between cavity walls 30 and polar end caps 66, 68, and the physical interface between rotor support axle 18 and rotor 16, provides robust structural support of rotor 16. This allows SMC device 10 to withstand high magnitude transient loads without physical contact between rotor 16 and housing assembly 12. In contrast, momentum control devices utilizing electromagnetic suspension systems may achieve exceptionally low (essentially zero) frictional losses, but typically require considerable power consumption to reliably maintain electromagnetic rotor suspension, are vulnerable to temporary interruptions in power supply, and are generally incapable of withstanding high magnitude transient loads without physical contact between the spinning rotor and the static housing interior. Finally, in addition to being highly energy efficient, SMC device 10 is also relatively compact, lightweight, and readily scalable.

Figure 5:
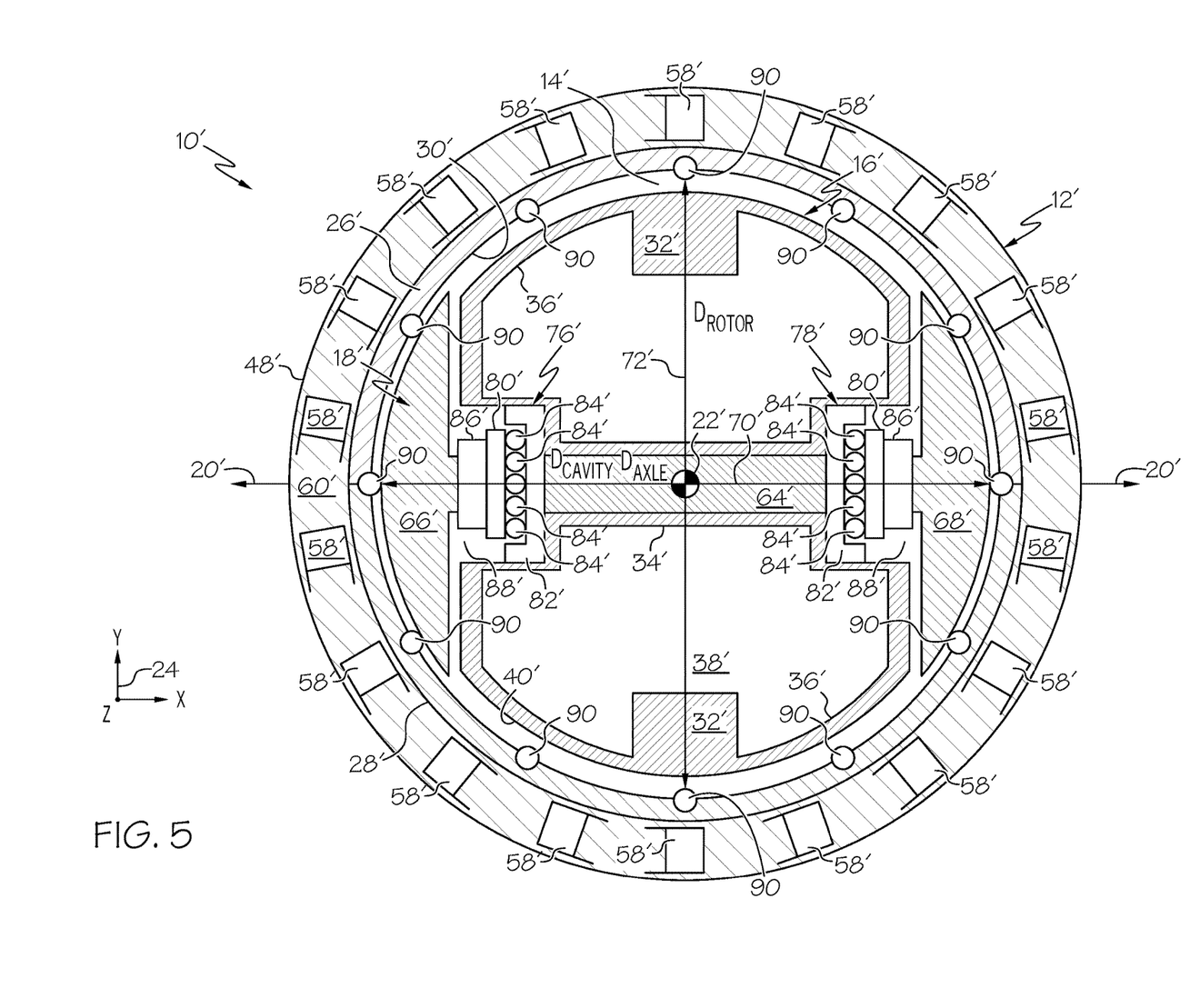
FIGS. 5 and 6 are cross-sectional views of other spherical bearing interfaces (partially shown) that may be provided between the rotor support axle and the interior of the housing assembly defining the generally spherical cavity in alternative embodiments of the SMC device.

In the above-described embodiment of SMC device 10, rolling element bearings are embedded within the polar end caps to contact the interior of the housing assembly and reduce frictional losses along the spherical bearing interface. In further embodiments, the spherical bearing interface can include other types of rolling element bearings or rolling element bearings disposed at other locations, such as point bearings embedded within the cavity walls and contacting the polar end caps of the rotor support axle. Further illustrating this point, FIG. 5 is a partial cross-sectional view of SMC device 10' in an alternative embodiment wherein like reference numerals are utilized to denote like structural features, but with the addition of a prime (') symbol to indicate that such features may vary to certain extents. In the embodiment shown in FIG. 5, rolling element bearings 90 are selectively positioned around the interior of generally spherical cavity 14' (e.g., in a spherical array concentric with cavity 14') to create a so-called "studded" cavity interface. As are rolling element bearings 74 described above in conjunction with FIGS. 2 and 3, rolling element bearings 90 may be single point ball bearings that are substantially similar to specialized ball transfer units, but which have been adapted for in-space usage and integrated into housing assembly 12. The balls of rolling element bearings 90 are embedded within the interior of housing assembly 12' (specifically, within cavity walls 30') and project radially into cavity 14' to contact rotor support axle 18. Rolling element bearings 90 are strategically-positioned around the interior of generally spherical cavity 14' and the components of SMC device 10' are dimensioned such that, at any given angular position of rotor support axle 18', a subset of rolling element bearings 90 contact polar end caps 66', 68' to physically support axle 18'. Polar end caps 66', 68' are again imparted with smooth, spherical cap geometries (e.g., outer surface geometries each substantially conformal with a portion of cavity 14') to effectively serve as three dimensional inner raceways along which bearings 90 travel as the angular orientation of rotor support axle 18' is altered or adjusted within generally spherical cavity 14'. Stated differently, a spherical array of rolling element bearings 90 is distributed around inner cavity walls 30', projects inwardly into generally spherical cavity 14', and engages the outer spherical cap surfaces of polar end caps 66', 68' to form the spherical bearing interface.

Figure 6:
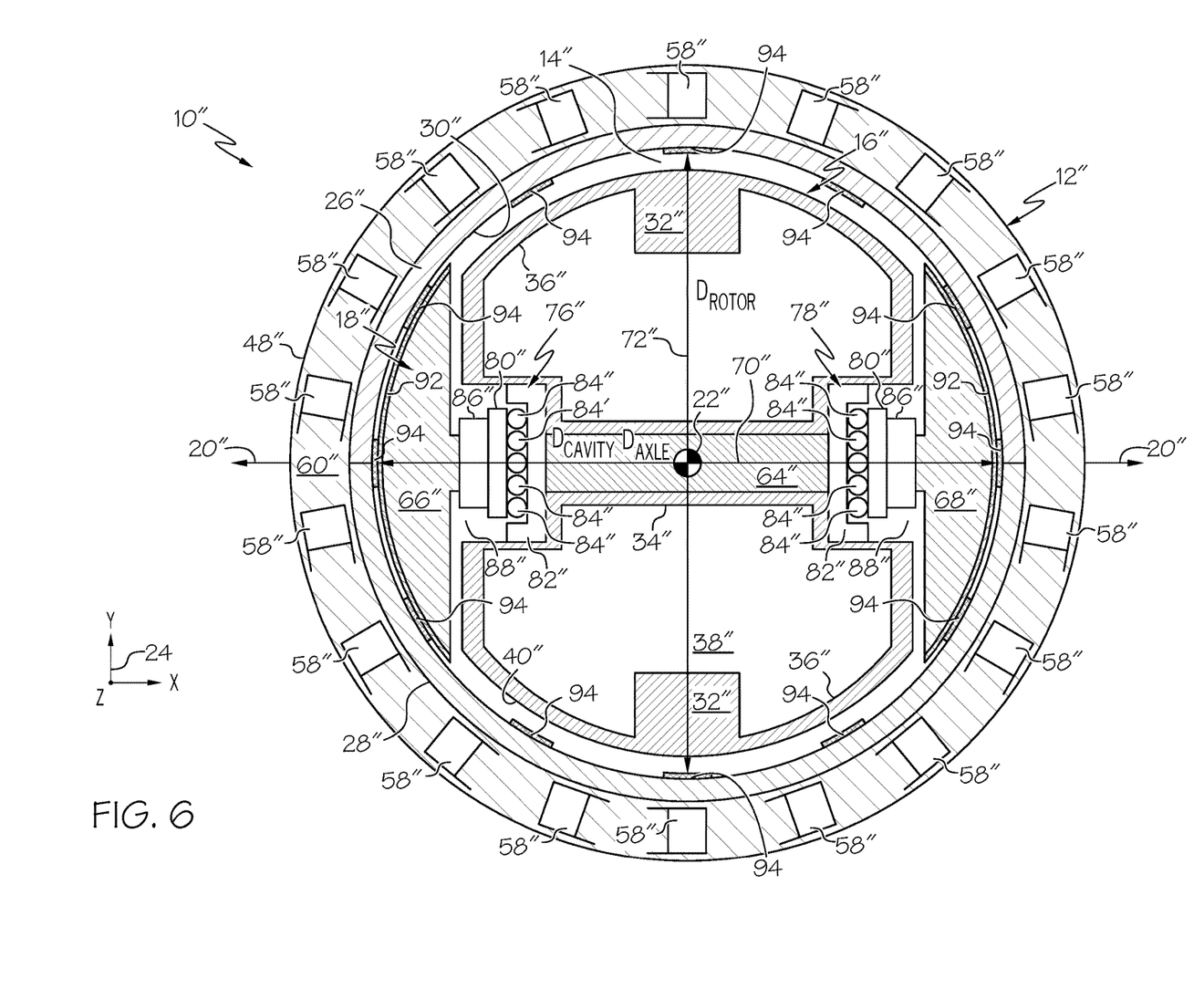

In still further embodiments, the spherical bearing interface may assume other forms or include additional structural features. For example, the polar end caps may have outer spherical cap surfaces, which contact the interior of the housing assembly bounding the spherical cavity to form a plane bearing interface therewith; the term "plane bearing," as appearing herein, indicating that a low friction interface is formed between two or more sliding surfaces and not implying that the bearing interface geometry is planar. Consider, for example, FIG. 6 illustrating a further embodiment of SMC device 10" wherein like reference numerals are utilized to denote like structural features, but with the addition of a double prime (") symbol to indicate that such features may vary to certain degrees. In the embodiment of FIG. 6, polar end caps 66", 68" are once again imparted with substantially smooth, spherical cap geometries. Additionally, the interior surface of housing assembly 12" (in particular, inner cavity walls 30") are imparted with a substantially smooth spherical geometry to facilitate sliding movement of polar caps 66", 68" against or along cavity walls 30" as the angular orientation of rotor support axle 18" is adjusted to alter the orientation of rotor 16" and spin axis 20". To further reduce frictional losses, one or more layers of low friction material 92 may be applied over the outer spherical cap surfaces of polar end caps 66", 68". Additionally or alternatively, one or more layers of low friction material 94 may be applied over the interior surface of housing assembly 12" defining generally spherical cavity 14". The applied low friction material may be formed as a continuous layer (e.g., as shown for material layer 92 shown in FIG. 6), as discretely-distributed as raised pads (e.g., as shown for material layer 94), or otherwise distributed along the spherical bearing interface in a manner providing physical support of polar end caps 66", 68", while reducing frictional losses during operation of SMC device 10".

There has thus been provided several embodiments of a SMC device, which is relatively compact, lightweight, scalable, and highly energy efficient from a power consumption standpoint. Embodiments of the above-described SMC device feature a highly efficient, low frictional loss architecture facilitating high speed rotation of the inertial mass or rotor about a rotor support axle or spin axis, which can be selectively and precisely adjusted to any desired orientation in the three dimensional space. Desired attitude adjustments of the host satellite (or other vehicle) can thus be effectuated by selectively adjusting the rotational orientation of the spinning rotor and/or by selectively adjusting the rotational speed of the rotor. The ability of the SMC device to provide torque outputs in any direction in three dimensional space allows the production of an attitude adjustment system containing a reduced number of devices. An attitude adjustment system utilizing a single SMC device or twin SMC devices (for redundancy) can consequently be produced that, relative to conventional attitude adjustment systems containing three to four CMGs or RWAs, provides substantial savings in the overall cost, weight, complexity, and envelope of the attitude adjustment system.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A spherical momentum control device, comprising:
   a housing assembly containing a generally spherical cavity having a center point;
   a rotor support axle disposed within the generally spherical cavity;
   a spherical bearing interface formed between the rotor support axle and the housing assembly and confining movement of the rotor support axle to rotation about three orthogonal axes transecting substantially at the center point of the generally spherical cavity; and
   a rotor mounted to the rotor support axle and rotatable relative thereto about a spin axis,
   wherein the rotor support axle comprises:
      a shaft having opposing ends, and
      polar end caps coupled to the opposing ends of the shaft and engaging the housing assembly along the spherical bearing interface, the polar end caps having opposing magnetic polarities.

2. The spherical momentum control device of claim 1 further comprising an electromagnetic drive system coupled to the housing assembly and to the rotor, the electromagnetic drive system configured to magnetically drive rotation of the rotor about the spin axis and to selectively adjust the orientation of the rotor support axle during operation of the spherical momentum control device.

3. The spherical momentum control device of claim 1 wherein the polar end caps each have an outer spherical cap surface.

4. The spherical momentum control device of claim 3 wherein the housing assembly comprises an inner cavity wall at least partially defining the generally spherical cavity, and wherein the outer spherical cap surfaces slide along the inner cavity wall as the rotor support axle is rotated about the orthogonal axes.

5. The spherical momentum control device of claim 3 wherein the housing assembly comprises:
   an inner cavity wall at least partially defining the generally spherical cavity; and
   a spherical array of rolling element bearings distributed around the inner cavity wall, projecting into the generally spherical cavity, and engaging the outer spherical cap surfaces to form the spherical bearing interface.

6. The spherical momentum control device of claim 1 wherein the housing assembly comprises an inner cavity wall at least partially defining the generally spherical cavity, and wherein the rotor support axle comprises rolling element bearings embedded in the polar end caps and projecting therefrom to engage the inner cavity wall and form the spherical bearing interface.

7. The spherical momentum control device of claim 1 wherein the rotor comprises an equatorial region, which is located between the polar end caps and around which the mass of the rotor is concentrated.

8. The spherical momentum control device of claim 1 wherein the rotor support axle has a length ($L_{AXLE}$) as taken along the spin axis, and wherein the rotor has a maximum outer diameter ($D_{ROTOR}$) less than $L_{AXLE}$.

9. The spherical momentum control device of claim 1 wherein the rotor has a substantially spherical outer geometry.

10. The spherical momentum control device of claim 1 wherein the rotor has points of alternating magnetic polarity distributed along an outer surface of the rotor.

11. The spherical momentum control device of claim 1, further comprising a first spin bearing disposed between the rotor support axle and a first end portion of the shaft.

12. A spherical momentum control device, comprising:
   a housing assembly containing a generally spherical cavity;
   a rotor support axle mounted within the generally spherical cavity and movable with respect to the housing assembly about three orthogonal axes; and
   a rotor contained within the generally spherical cavity and rotatably mounted to the rotor support axle for rotation about a spin axis,
   wherein the rotor support axle comprises:
      a shaft having opposing ends, and
      polar end caps coupled to the opposing ends of the shaft and engaging the housing assembly along the spherical bearing interface, the polar end caps having opposing magnetic polarities.

13. The spherical momentum control device of claim 12 wherein the generally spherical cavity has a diameter $D_{CAVITY}$, wherein the rotor support axle has a maximum length $L_{AXLE}$, wherein the rotor has a maximum diameter $D_{ROTOR}$, and wherein $D_{CAVITY} > L_{AXLE} > D_{ROTOR}$.

14. The spherical momentum control device of claim 13 further comprising a plurality of rolling element bearings embedded within the rotor support axle and project outwardly therefrom to contact an interior portion of the housing assembly defining the generally spherical cavity.

15. The spherical momentum control device of claim 13 further comprising a plurality of rolling element bearings embedded within an interior portion of the housing assembly and project inwardly therefrom to selectively contact end portions of the rotor support axle.

* * * * *